(12) United States Patent
Marks et al.

(10) Patent No.: US 11,662,832 B1
(45) Date of Patent: May 30, 2023

(54) SYSTEM AND METHOD FOR ENHANCING FUNCTIONALITY OF ELECTRONIC DEVICES

(71) Applicant: Google LLC, Mountain View, CA (US)

(72) Inventors: Richard Lee Marks, Pleasanton, CA (US); Ding Xu, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/895,219

(22) Filed: Aug. 25, 2022

(51) Int. Cl.

| | | |
|---|---|---|
| *G06F 3/01* | (2006.01) | |
| *G06F 3/0488* | (2022.01) | |
| *H04W 4/80* | (2018.01) | |
| *G06F 1/16* | (2006.01) | |
| *H04W 4/02* | (2018.01) | |
| *G06F 3/16* | (2006.01) | |

(52) U.S. Cl.
CPC .............. *G06F 3/017* (2013.01); *G06F 1/163* (2013.01); *G06F 3/0488* (2013.01); *G06F 3/167* (2013.01); *H04W 4/023* (2013.01); *H04W 4/80* (2018.02)

(58) Field of Classification Search
CPC ........ G06F 3/017; G06F 1/163; G06F 3/0488; G06F 3/167; H04W 4/80; H04W 4/023
See application file for complete search history.

(56) References Cited

U.S. PATENT DOCUMENTS

2019/0319999 A1* 10/2019 Davison .................. G06F 3/167

* cited by examiner

*Primary Examiner* — Sejoon Ahn
(74) *Attorney, Agent, or Firm* — Kilpatrick Townsend & Stockton LLP

(57) ABSTRACT

Features described herein generally relate to enhancing functionality of electronic devices. Particularly, a notification is received from a wearable device that includes a position of the wearable device within an area, a determination is made that the wearable device is located within a predetermined distance from a controllable device, a graphical user interface page that includes buttons is sent to the wearable device, an indication that a button of the buttons has been activated is received from the wearable device, and a command signal that includes an instruction is sent to the controllable device. In this way, functionality of electronic devices can be extended with wearable devices.

20 Claims, 6 Drawing Sheets

SYSTEM AND METHOD FOR ENHANCING FUNCTIONALITY OF ELECTRONIC DEVICES

FIELD

The present disclosure generally relates to electronic devices. Particularly, the present disclosure relates to a system and method for enhancing functionality of electronic devices.

BACKGROUND

Many manufacturers of household devices, such as televisions, home theater systems, oscillating fans, and the like, typically supply electronic devices (e.g., remote controls) to control those devices. Often these remote controls have limited functionality. Typically, these remote controls only include circuitry necessary to enable basic control of the household devices, but not to connect the remote controls to networks or other devices or provide functionality beyond basic control.

SUMMARY

Embodiments described herein pertain to a system and method for enhancing functionality of electronic devices.

According to some embodiments, a method for enhancing functionality of an electronic device for controlling a controllable device includes receiving a notification from the wearable device, the notification including a position of the wearable device within an area which is determined based on signals received by an ultra-wideband (UWB) receiver of the wearable device from UWB positioning devices installed in the area; determining that the wearable device is located within a predetermined distance from the controllable device based on the position of the wearable device within the area; sending a graphical user interface page to the wearable device in which the graphical user interface page includes buttons for display on a touchscreen display of the wearable device; receiving an indication that a first button of the buttons has been activated from the wearable device; and sending a first command signal including a first instruction to the controllable device that corresponds to a gesture performed by a user wearing the wearable device.

In some embodiments, the wearable device generates the notification in response to a determination that the user has oriented the wearable device in a particular direction and performed a predetermined gesture with the wearable device.

In some embodiments, the particular direction is a direction in which a plane of a display screen of the wearable device is parallel to a ground plane.

In some embodiments, the determination that the user has oriented the wearable device in the particular direction is based on signals output by orientation detection circuitry of the wearable device.

In some embodiments, the plurality of buttons comprises a gesture button, a voice button, and a haptic button.

In some embodiments, the indication is received in response to the user touching an area of the touchscreen display of the wearable device that corresponds to the first button.

In some embodiments, the wearable device includes a band for wearing the wearable device on a body part of the user.

In some embodiments, the controllable device includes display circuitry for displaying video signals, audio circuitry for outputting audio signals, and communications circuitry for receiving command signals.

In some embodiments, the method further includes receiving an indication that a second button of the buttons has been activated from the wearable device; and sending a second command signal including a second instruction to the controllable device where the second instruction corresponds to a voice command made by the user.

According to some embodiments, a system for enhancing functionality of an electronic device for controlling a controllable device includes a wearable device; the controllable device; and a network-enabled device that is communicatively coupled to the controllable device and includes one or more processors and one or more memories, where the one or more memories store instructions which, when executed by the one or more processors, cause the one or more processors to perform part or all of the operations and/or methods disclosed herein. Some embodiments of the present disclosure also include one or more non-transitory computer-readable media storing computer-readable instructions that, when executed by one or more processors, cause the one or more processors to perform part or all of the operations and/or the methods disclosed herein.

DETAILED DESCRIPTION

Figure 1:
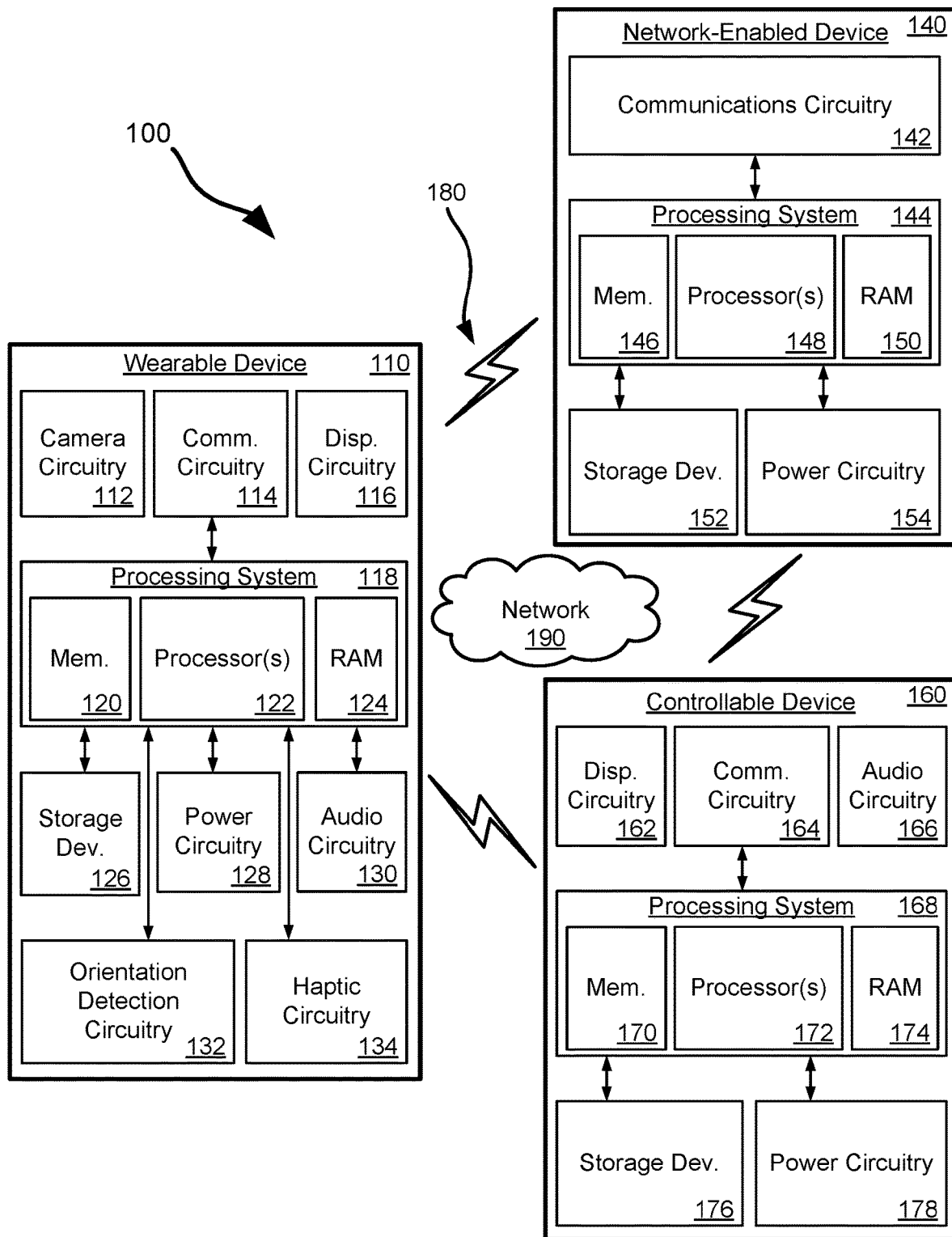
FIG. 1 shows an embodiment of an example system for enhancing functionality of an electronic device for controlling a controllable device according to some aspects of the present disclosure.

Electronic devices (e.g., remote controls) supplied with controllable devices commonly found around a house (e.g., televisions, home theater systems, oscillating fans, etc.) typically only include circuitry that enables those devices to provide basic control over the controllable devices. Often these electronic devices do not include circuitry that enables these electronic devices to a connect to a network and/or other devices and applications such as smart phones and their applications. Additionally, these electronic devices are not provided with enhanced functionality such as the ability to control controllable devices with gestures or voice input and the ability to provide haptic feedback. As a result, users end up abandoning these electronic devices and finding other solutions such as remote controls with different functionality, streaming sticks, and/or other intelligent add-on devices. In some cases, users use applications on their smart devices as a substitute for these electronic devices. However, these solutions are inconvenient for users, do not work well, and are often cost prohibitive. What is needed is a means to enhance the functionality of these electronic devices.

Features described herein overcome these problems by enhancing the functionality of these electronic devices using a wearable device and a network-enabled device. A user wearing the wearable device may wish to enhance the functionality of the electronic device. As such, the user may orient the wearable device in a certain direction and perform a gesture with the wearable device. The wearable device can send a notification to the network-enabled device that includes a position of the wearable device within an area. The wearable device can determine its position based on one or more ultra-wideband (UWB) receivers of the wearable device and UWB positioning devices installed in the area.

In response to receiving the notification, the network-enabled device can determine that the wearable device is located within a predetermined distance from the controllable device and generate and send one or more graphical user interface (GUI) pages to the wearable device. The GUI page can include buttons that can be displayed on a display of the wearable device. When the user selects or otherwise activates a button and performs a gesture and/or speaks a voice command, the wearable device can send a notification to the network-enabled device that indicates the button that was selected or otherwise activated and the gesture performed and/or the voice command spoken.

In response to receiving the notification, the network-enabled device can send a command signal to the controllable device that includes an instruction for controlling the controllable device. The instruction can correspond to the gesture performed by the user, the voice command spoken by the user, and/or the button selected or otherwise activated by the user. In response to receiving the command signal, the controllable device may execute the instructions. In this way, functionality of the electronic device can be extended with the wearable device and the network-enabled device.

FIG. 1 shows an embodiment of an example system 100 for enhancing functionality of an electronic device for controlling a controllable device 160. As shown in FIG. 1, the system 100 includes a wearable device 110, a network-enabled device 140, and a controllable device 160. The wearable device 110 includes camera circuitry 112. Camera circuitry 112 may be configured to capture images and video of one or more users of the wearable device 110 and an environment surrounding the one or more users and the wearable device 110. Examples of camera circuitry 112 include one or more digital or electronic cameras, light field cameras, three-dimensional (3D) cameras, image sensors, imaging arrays, under-display cameras, and/or other circuitry that enables the wearable device 110 to capture images and video of one or more users of the wearable device 110 and an environment surrounding the one or more users and the wearable device 110.

The wearable device 110 also includes communications circuitry 114.

Communications circuitry 114 may be configured to enable the wearable device 110 to communicate with and send and receive data and other information over wired or wireless networks such as network 190. Communications circuitry 114 may also be configured to enable the wearable device 110 to communicate with and send and receive data and other information over wired or wireless communication channels such as wireless link 180. Communications circuitry 114 may also be configured to enable the wearable device 110 to communicate with, send data and other information to, and receive data and other information from other systems and devices such as network-enabled device 140 and controllable device 160. Examples of communications circuitry 114 include wireless communication modules and chips; wired communication modules and chips; chips for communicating over local area networks, wide area networks, cellular networks, satellite networks, fiber optic networks, Internet networks, and the like; a system on a chip; Bluetooth chips; Near Field Communication (NFC) chips; radio frequency identification (RFID) chips; and/or other circuitry that enables the wearable device 110 to send and receive data over a wired or wireless networks and/or communication channels.

The wearable device 110 also includes display circuitry 116. Display circuitry 116 may be configured to display images, video, content, graphics, GUI pages, and the like to one or more users. The display circuitry 116 may also be configured to present, to one or more users, a user interface such as a GUI for enabling the one or more users to interact with the wearable device 110. The display circuitry 116 may also be configured to receive input from one or more users such as touch input, stylus input, gaze input, and the like. Examples of display circuitry 116 include one or more liquid crystal displays (LCD), light emitting diode (LED) displays, organic LED (OLED) displays, digital light projector (DLP) displays, liquid crystal on silicon (LCoS) displays, touchscreen displays, and/or other devices that are suitable for presenting visualizations and/or information to one or more users and receiving input from the one or more users.

The wearable device 110 also includes audio circuitry 130. Audio circuitry 130 may be configured to record sounds from a surrounding environment of the wearable device 110 and output sounds to one or more users of the wearable device 110. Examples of audio circuitry 130 include microphones, speakers, and/or other audio and sound transducer devices that are suitable for recording and outputting audio and other sounds.

The wearable device 110 also includes orientation detection circuitry 132. Orientation detection circuitry 132 may be configured to determine a location, a position, an orientation, an attitude, and/or a posture for the wearable device 110 and one or more users of the wearable device 110. The orientation detection circuitry 132 may also be configured to determine a range between the wearable device 110 and other devices such as network-enabled device 140 and controllable device 160. Examples of orientation detection circuitry 132 include one or more satellite navigation devices such as global positioning system (GPS) devices, indoor localization devices such as ultra-wideband (UWB) transmitters and receivers, light detection and ranging (LiDAR) localization devices, radio detection and ranging (RADAR) localization devices, wireless fidelity (WiFi) localization devices, microwave localization devices, Bluetooth localization devices, accelerometers, gyroscopes, motion sensors, tilt sensors, inclinometers, angular velocity sensors, gravity sensors, inertial measurement units (IMUs), magnetometers, and compasses. Other examples of orientation detection circuitry 132 include other devices that are suitable for determining an indoor position, an outdoor position, an orientation, and a posture of the wearable device 110 and one or more users of the wearable device 110 and determining a range between the wearable device 110 and one or more other devices.

The wearable device 110 also includes haptic circuitry 134. Haptic circuitry 134 may be configured to provide haptic feedback to and receive haptic feedback from one or more users of the wearable device 110. Examples of haptic circuitry 134 include one or more vibrators, actuators, haptic feedback devices, and/or other devices that are suitable for generating vibrations and providing other haptic feedback to one or more users of the wearable device 110.

The wearable device 110 also includes power circuitry 128. Power circuitry 128 may be configured to generate power and/or receive power and provide power to the wearable device 110. Examples of power circuitry 128 include batteries, power supplies, charging circuits, solar panels, and/or other devices that can generate power and/or receive power from a source external to the wearable device 110 and power the wearable device 110 with the generated and/or received generated power.

The wearable device 110 also includes processing system 118. Processing system 118 may be configured to provide the wearable device 110 with enhanced functionality in accordance with a part or all of the operations and/or methods disclosed herein. The processing system 118 includes one or more memories 120, one or more processors 122, and random-access memory (RAM) 124. The one or more processors 122 can read one or more programs from the one or more memories 120 and execute them using RAM 124. In some embodiments, the one or more programs are configured to provide the wearable device 110 with enhanced functionality in accordance with a part or all of the operations and/or methods disclosed herein. The one or more processors 122 may be of any type including but not limited to a microprocessor, a microcontroller, a central processing unit (CPU), a graphical processing unit (GPU), a digital signal processor (DSP), an application-specific integrated circuit (ASIC), a field programmable gate array (FPGA), or any combination thereof. In some embodiments, the one or more processors 122 may include a plurality of cores, a plurality of arrays, one or more coprocessors, and/or one or more layers of local cache memory.

The one or more memories 120 can be non-volatile and may include any type of memory device that retains stored information when powered off. Non-limiting examples of memory include electrically erasable and programmable read-only memory (EEPROM), flash memory, or any other type of non-volatile memory. At least one memory of the one or more memories 120 can include a non-transitory computer-readable storage medium from which the one or more processors 122 can read instructions. A computer-readable storage medium can include electronic, optical, magnetic, or other storage devices capable of providing the one or more processors 122 with computer-readable instructions or other program code. Non-limiting examples of a computer-readable storage medium include magnetic disks, memory chips, read-only (ROM), RAM, an ASIC, a configured processor, optical storage, or any other medium from which a computer processor can read the instructions.

Figure 2:
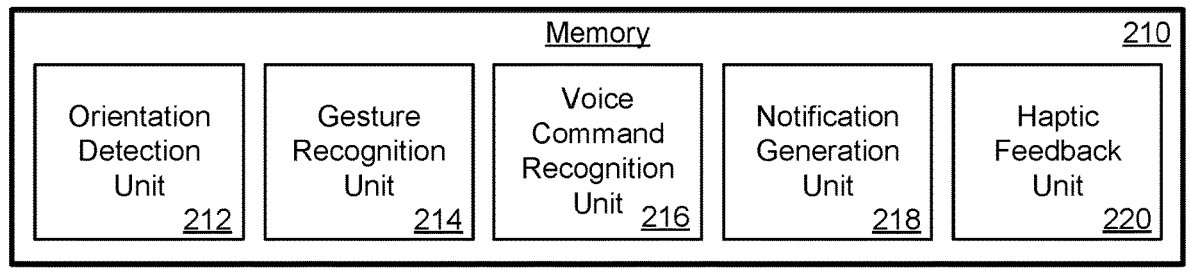
FIG. 2 shows an embodiment of another example system for enhancing functionality of an electronic device for controlling a controllable device according to some aspects of the present disclosure.
Figure 2:
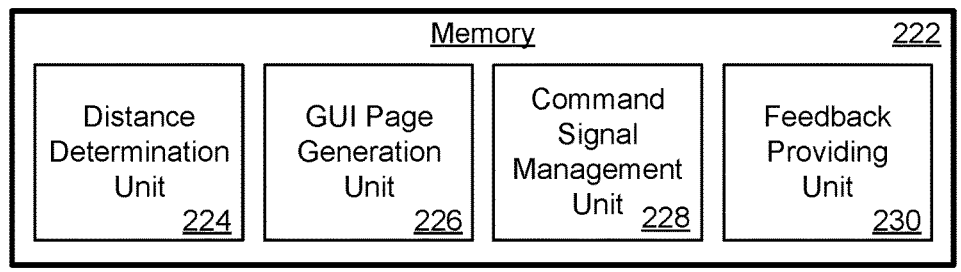
Figure 2:
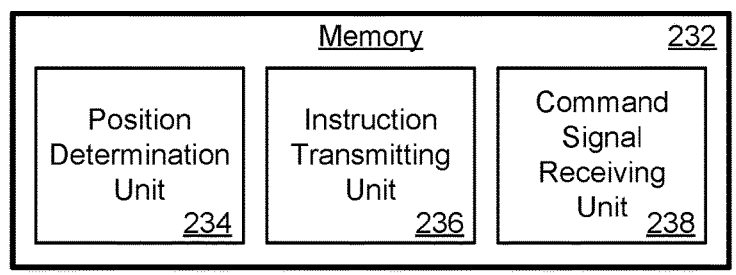

In some embodiments, the one or more memories 120 include memory 210 (FIG. 2). As shown in FIG. 2, memory 210 includes an orientation detection unit 212, a gesture recognition unit 214, a voice command recognition unit 216, a notification generation unit 218, and a haptic feedback unit 220. The orientation detection unit 212 is configured to determine an orientation of the wearable device 110. In some embodiments, the orientation detection unit 212 is configured to determine whether the wearable device 110 is oriented in a particular direction. For example, the orientation detection unit 212 can determine whether the wearable device 110 is oriented in a direction in which a plane of a display screen of display circuitry 116 is parallel to a ground plane. In some embodiments, the orientation detection unit 212 determines the orientation of the wearable device 110 based on signals output by the orientation detection circuitry 132 relative to a frame of reference. In some embodiments, the frame of reference can be based on a default orientation of the orientation detection circuitry 132, a default orientation of the wearable device 110, and/or the Earth (e.g., an Earth-centered, Earth-fixed frame of reference, a north-east-down frame of reference, and/or an earth-centered inertial frame of reference).

The orientation detection unit 212 is also configured to determine a position of the wearable device 110. In some embodiments, the orientation detection unit 212 is configured to determine the position of the wearable device 110 based on signals received by one or more UWB receivers included in the orientation detection circuitry 132 of the wearable device 110 from UWB positioning devices installed in the area. In some embodiments, orientation detection unit 212 determines the position of the wearable device 110 by transmitting ranging signals from the one or more UWB receivers to the UWB positioning devices, receiving ranging signals with the one or more UWB receivers transmitted from the UWB positioning devices, performing a ranging operation based on the ranging signals, and performing a trilateration or multilateration operation based on the ranging operation. In some embodiments, the orientation detection unit 212 can perform the ranging operation based on one on more of angle of arrival (AOA), time difference of arrival (TDoA), two-way ranging (TWR), time-of-flight (ToF), and phase-difference of arrival (PDoA). In some embodiments, the orientation detection unit 212 can perform the trilateration or multilateration operation based on a ranging operation performed between the wearable device 110 and at least three different UWB positioning devices. In some embodiments, the orientation detection unit 212 can determine the position the wearable device 110 based on the distance between the wearable device 110 and each of the at least three UWB positioning devices. In some embodiments, the position of the wearable device 110 lies on an intersection point between circles having radiuses representing the distances between the wearable device 110 and the different UWB positioning devices.

The gesture recognition unit 214 is configured to recognize gestures performed by a user wearing the wearable device 110 (e.g., on their wrist). In some embodiments, the gesture recognition unit 214 is configured to recognize gestures based on signals output by the orientation detection circuitry 132. In some embodiments, the gesture recognition unit 214 detects whether the user has performed a gesture by determining whether or not the user has continuously moved the wearable device 110 from a starting position to an end position. For example, the gesture recognition unit 214 can determine that the user wearing the wearable device 110 has moved the wearable device 110 from a starting position in which a plane of a display screen of the display circuitry 116 is parallel to a ground plane to an end position in which the plane of the display screen is perpendicular to the ground plane (i.e., the user has performed a wrist rotation gesture). In some embodiments, movement of the wearable device 110 can be determined based on signals output by the orientation detection circuitry 132 and an orientation of the wearable device 110 determined by the orientation detection unit 212 at the starting and end positions.

In some embodiments, in response to the gesture recognition unit 214 detecting that the user has performed a gesture, the gesture recognition unit 214 can recognize the detected gesture by converting the signals output by the orientation detection circuitry 132 during movement of the wearable device 110 into motion vectors and comparing the motion vectors for the detected gesture to motion vectors for gestures in a list of defined gestures. In some embodiments, the motion vectors for the gestures in the list of defined gestures can correspond to motion vectors converted from signals that would be output by the orientation detection circuitry 132 if those gestures were performed by the user wearing the wearable device 110. In some embodiments, the gesture recognition unit 214 can define the gestures in the list of defined gestures by measuring the signals output by the orientation detection circuitry 132 while the user is performing the gestures in a gesture recognition set-up mode. In some embodiments, the list of defined gestures can be stored in one or more storage devices 126 and include between 2 and 10 gestures. In some embodiments, the defined gestures may include gestures corresponding to rotational and/or translational movements of the wearable device 110.

In some embodiments, one of the gestures in the list of defined gestures may be set as a predetermined gesture. For example, the user may identify a gesture in the list of defined gestures that corresponds to a clockwise rotation of the wearable device 110 and set that gesture as the predetermined gesture. In some embodiments, a user may desire to enter into an enhanced functionality mode in which the wearable device 110 enhances the functionality of the electronic device for controlling the controllable device 160. To enter the enhanced functionality mode, the user may hold the wearable device 110 in a particular orientation for a predetermined period of time (e.g., two seconds) and then perform the predetermined gesture with the wearable device 110.

The voice command recognition unit 216 is configured to recognize voice commands made by a user wearing the wearable device 110 (e.g., on their wrist). The voice command recognition unit 216 is configured to recognize voice commands based on signals output by the audio circuitry 130. In some embodiments, the voice command recognition unit 216 includes voice activity detection (VAD) functionality and spoken language understanding (SLU) functionality including speech recognition and natural language understanding (NLU) functionality. The voice command recognition unit 216 can recognize voice commands by converting the signals output by the audio circuitry 130 into one or more input words, phrases, and/or statements and comparing the one or more input words, phrases, and/or statements to one or more words, phrases, and/or statements in a list of voice commands. In some embodiments, the one or more input words, phrases, and/or statements can be converted into one or more feature vectors and compared to one or more feature vectors corresponding to the words, phrases, and/or statements in the list of voice commands. In some embodiments, the voice command recognition unit 216 can define the voice commands in the list of voice commands by processing the signals output by the audio circuitry 130 using the SLU functionality while the user speaks in a voice command recognition set-up mode. In some embodiments, the list of voice commands can be stored in one or more storage devices 126 and include between 2 and 10 voice commands. In some embodiments, the list of voice commands may include voice commands related to operational controls of the controllable device 160 (e.g., power on, power off, delayed start, timer, mode, etc.).

The notification generation unit 218 is configured to send a notification to the network-enabled device 140 in response to the wearable device 110 entering the enhanced functionality mode. In some embodiments, the notification can include an indication that the wearable device 110 has entered into the enhanced functionality mode and a position of the wearable device 110 within an area determined by the orientation detection unit 202.

The notification generation unit 218 is also configured to send a notification to the network-enabled device 140 in response to the user selecting or otherwise activating a gesture button of the wearable device 110 (e.g., a button on a touchscreen display of the wearable device 110) and performing a gesture (e.g., a left flick gesture, a right flick gesture, an up flick gesture, and a down flick gesture) with the wearable device 110 that is recognized by the gesture recognition unit 214 and in the list of defined gestures. In some embodiments, the notification can indicate the button that has been selected or otherwise activated and the gesture performed by the user.

The notification generation unit 218 is also configured to send a notification to the network-enabled device 140 in response to the user selecting or otherwise activating a voice button of the wearable device 110 (e.g., a button on a touchscreen display of the wearable device 110) and speaking a voice command (e.g., turn on the device) to the wearable device 110 that is recognized by the voice command recognition unit 216 and in the list of voice commands. In some embodiments, the notification can indicate the button that has been selected or otherwise activated and the voice command spoken by the user.

The notification generation unit 218 is also configured to send a notification to the network-enabled device 140 in response to the user selecting or otherwise activating a volume adjustment button, a channel selection button, a guide button, and a menu button. In some embodiments, the notification can indicate the button that has been selected or otherwise activated.

The haptic feedback unit 220 is configured to provide haptic feedback to the user in response to the user selecting or otherwise activating a haptic button of the wearable device 110 (e.g., a button on a touchscreen display of the wearable device 110). In some embodiments, the haptic feedback unit 220 is configured to provide haptic feedback in response to receiving a confirmation signal from the network-enabled device 140 that a command signal has been sent from the network-enabled device 140 to the controllable device 160. In some embodiments, the haptic feedback can include a predetermined vibration pattern output by haptic circuitry 134.

The wearable device 110 also includes one or more storage devices 126. The one or more storage devices 126 may be configured to store data and other information received by and/or generated by the wearable device 110, the network-enabled device 140, and/or the controllable device 160. The one or more storage devices 126 may be removable storage devices, non-removable storage devices, or a combination thereof. Examples of removable storage and non-removable storage devices include magnetic disk devices such as hard disk drives (HDDs); optical disk drives such as compact disk (CD) drives and digital versatile disk (DVD) drives; solid-state drives (SSDs); and tape drives.

The wearable device 110 may also include other input and output (I/O) components. Examples of such input components can include a mouse, a keyboard, a trackball, a touch pad, a touchscreen display, a stylus, a data glove, and the like. Examples of such output components can include a holographic display, a three-dimensional (3D) display, a projector, and the like. The foregoing description of the wearable device 110 is not intended to be limiting and the wearable device 110 may include fewer components or additional components than those described above.

The network-enabled device 140 includes communications circuitry 142. Communications circuitry 142 may be configured to enable the network-enabled device 140 to communicate with and send and receive data and other information over wired or wireless networks such as network 190. Communications circuitry 142 may also be configured to enable the wearable device 110 to communicate with and send and receive data and other information over wired or wireless communication channels such as wireless link 180. Communications circuitry 142 may also be configured to enable the network-enabled device 140 to communicate with, send data and other information to, and receive data and other information from other systems and devices such as wearable device 110 and controllable device 160. Examples of communications circuitry 142 include wireless communication modules and chips; wired communication modules and chips; chips for communicating over local area networks, wide area networks, cellular networks, satellite networks, fiber optic networks, Internet networks, and the like; a system on a chip; Bluetooth chips; Near Field Communication (NFC) chips; radio frequency identification (RFID) chips; and/or other circuitry that enables the network-enabled device 140 to send and receive data over a wired or wireless networks and/or communication channels.

The network-enabled device 140 also includes power circuitry 154. Power circuitry 154 may be configured to generate power and/or receive power and provide power to the network-enabled device 140. Examples of power circuitry 154 include batteries, power supplies, charging circuits, solar panels, and/or other devices that can generate power and/or receive power from a source external to the network-enabled device 140 and power the network-enabled device 140 with the generated and/or received generated power.

The network-enabled device 140 also includes processing system 144 which may be configured to provide the wearable device 110 with enhanced functionality in accordance with a part or all of the operations and/or methods disclosed herein. The processing system 144 includes one or more memories 146, one or more processors 148, and RAM 150. The one or more processors 148 can read one or more programs from the one or more memories 146 and execute them using RAM 150. In some embodiments, the one or more programs are configured to provide the wearable device 110 with enhanced functionality in accordance with a part of all of the operations and/or methods disclosed herein, such as those shown in FIG. 4. The one or more processors 148 may be of any type including but not limited to a microprocessor, a microcontroller, a CPU, a GPU, a DSP, an ASIC, a FPGA, or any combination thereof. In some embodiments, the one or more processors 148 may include a plurality of cores, a plurality of arrays, one or more coprocessors, and/or one or more layers of local cache memory.

The one or more memories 146 can be non-volatile and may include any type of memory device that retains stored information when powered off. Non-limiting examples of memory include EEPROM, flash memory, or any other type of non-volatile memory. At least one memory of the one or more memories 146 can include a non-transitory computer-readable storage medium from which the one or more processors 148 can read instructions. A computer-readable storage medium can include electronic, optical, magnetic, or other storage devices capable of providing the one or more processors 148 with computer-readable instructions or other program code. Non-limiting examples of a computer-readable storage medium include magnetic disks, memory chips, ROM, RAM, an ASIC, a configured processor, optical storage, or any other medium from which a computer processor can read the instructions.

In some embodiments, the one or more memories 146 include memory 222 (FIG. 2). As shown in FIG. 2, memory 222 includes a distance determination unit 224, a GUI page generation unit 226, a command signal management unit 228, and a feedback providing unit 230. The distance determination unit 224 is configured to determine whether the wearable device 110 is located within a predetermined distance from the controllable device 160. In some embodiments, the distance determination unit 224 is configured to compare the position of the wearable device 110 in the area to the position of the controllable device 160 in the area. As described above, the position of the wearable device 110 within the area may be included in the notification sent from the wearable device 110 to the network-enabled device 140. The position of the controllable device 160 within the area may be included in a notification sent from the controllable device 160 to the network-enabled device 140. In some embodiments, the user may set the predetermined distance or the network-enabled device 140 can set the predetermined distance based on an estimated size of the area. In some embodiments, the size of the area can be estimated based on signals (e.g., ranging signals) transmitted from and received by the communications circuitry 142 of the network-enabled device 140.

The GUI page generation unit 226 is configured to generate and send one or more GUI pages to the wearable device 110 in response to the network-enabled device 140 determining that the wearable device 110 is located within the predetermined distance from the controllable device 160. In some embodiments, the GUI page can include buttons that can be displayed on a display of the wearable device 110. In some embodiments, the buttons can include a gesture button, a voice button, and a haptic button. In other embodiments, the buttons can include a volume adjustment button, a channel selection button, a guide button, and a menu button. In some embodiments, the GUI page can include information about a status and/or an operation of the controllable device 160.

The command signal management unit 228 is configured to send a command signal to the controllable device 160 in response to a notification received from the wearable device 110. As described above, the notification is sent by the wearable device 110 in response to the selection or otherwise activation of a button (e.g., the gesture button, the voice button, the volume adjustment button, the channel selection button, the guide button, and the menu button) by a user of the wearable device 110 and can indicate the button that was selected or otherwise activated and include the gesture performed by the user and/or the voice command spoken by the user.

The command signal management unit 228 is configured to send a command signal to the controllable device 160 that includes an instruction for controlling the controllable device 160. The instruction can correspond to the gesture performed by the user, the voice command spoken by the user, and/or the button selected or otherwise activated by the user. The command signal management unit 228 can store a list of instructions for controlling the controllable device 160 and an association between a set of gestures and the list of instructions such that each gesture in the set of gestures is associated with an instruction in the list of instructions. The command signal management unit 228 can also store an association between a set of voice commands and the list of instructions such that each voice command in the set of voice commands is associated with an instruction in the list of instructions. The command signal management unit 228 can also store an association between the volume adjustment button, the channel selection button, the guide button, and the menu button and the list of instructions such that each of the volume adjustment button, the channel selection button, the guide button, and the menu button is associated with an instruction in the list of instructions.

Each instruction in the list of instructions can be an instruction for controlling the controllable device 160 in a certain way. For example, a first instruction in the list of instructions can be an instruction for powering on the controllable device 160, a second instruction in the list of instructions can be an instruction for powering down the controllable device 160, a third instruction in the list of instructions can be an instruction for changing an operation of the controllable device 160 (e.g., changing a channel, raising the volume, decreasing a speed, lowering the temperature), and so on.

The instructions in the list of instructions can be defined by the user. For example, during a set-up mode of the network-enabled device 140, the user can define each instruction in the list of instructions and associate a gesture from the set of gestures and/or a voice command from the set of voice commands with a respective instruction. In some embodiments, a list of available instructions is received from the controllable device 160 such that the user can associate each instruction in the list of available instructions with a gesture in the set of gestures, a voice command in the list of voice commands, the volume adjustment button, the channel selection button, the guide button, and/or the menu button.

The feedback providing unit 230 is configured to send a confirmation signal to the wearable device 110 in response to the network-enabled device 140 sending the command signal to the controllable device 160.

The network-enabled device 140 also includes one or more storage devices 152 configured to store data and other information received by and/or generated by the network-enabled device 140, the wearable device 110, and/or the controllable device 160. The one or more storage devices 152 may be removable storage devices, non-removable storage devices, or a combination thereof. Examples of removable storage and non-removable storage devices include magnetic disk devices such as HDDs; optical disk drives such CD drives and DVD drives; SSDs; and tape drives.

The network-enabled device 140 may also include other I/O components. Examples of such input components can include a mouse, a keyboard, a trackball, a touch pad, a touchscreen display, a stylus, a data glove, and the like. Examples of such output components can include a holographic display, a 3D display, a projector, and the like. The foregoing description of the network-enabled device 140 is not intended to be limiting and the network-enabled device 140 may include fewer components or additional components than those described above.

The network-enabled device 140 may also include orientation detection circuitry. The orientation detection circuitry may be configured to determine a location, a position, an orientation, an attitude, and/or a posture for the network-enabled device 140. The orientation detection circuitry may also be configured to determine a range between the network-enabled device 140 and other devices such as wearable device 110 and controllable device 160. Examples of orientation detection circuitry include one or more satellite navigation devices such as GPS devices, indoor localization devices such as UWB transmitters and receivers, LiDAR localization devices, RADAR localization devices, WiFi localization devices, microwave localization devices, Bluetooth localization devices, accelerometers, gyroscopes, motion sensors, tilt sensors, inclinometers, angular velocity sensors, gravity sensors, IMUs, magnetometers, and compasses. Other examples of orientation detection circuitry include other devices that are suitable for determining an indoor position, an outdoor position, an orientation, and a posture of the network-enabled device 140 and determining a range between the network-enabled device 140 and one or more other devices.

The controllable device 160 includes display circuitry 162. Display circuitry 162 may be configured to display images, video, content, graphics, GUI pages, and the like to one or more users and/or viewers. The display circuitry 162 may also be configured to present, to one or more users and/or viewers, a user interface such as a GUI for enabling the one or more users and/or viewers to interact with the controllable device 160. The display circuitry 162 may also be configured to receive input from one or more users such as touch input, stylus input, gaze input, and the like. Examples of display circuitry 162 include one or more LCD displays, LED displays, OLED displays, DLP displays, LCoS displays, touchscreen displays, and/or other devices that are suitable for presenting visualizations and/or information to one or more users and receiving input from the one or more users.

The controllable device 160 includes communications circuitry 164. Communications circuitry 164 may be configured to enable the controllable device 160 to communicate with and send and receive data and other information over wired or wireless networks such as network 190. Communications circuitry 164 may also be configured to enable the controllable device 160 to communicate with and send and receive data and other information over wired or wireless communication channels such as wireless link 180. Communications circuitry 164 may also be configured to enable the controllable device 160 to communicate with, send data and other information to, and receive data and other information from other systems and devices such as network-enabled device 140 and controllable device 160. Examples of communications circuitry 164 include wireless communication modules and chips; wired communication modules and chips; chips for communicating over local area networks, wide area networks, cellular networks, satellite networks, fiber optic networks, Internet networks, and the like; a system on a chip; Bluetooth chips; Near Field Communication (NFC) chips; radio frequency identification (RFID) chips; and/or other circuitry that enables the controllable device 160 to send and receive data over a wired or wireless networks and/or communication channels.

The controllable device 160 also includes audio circuitry 166. Audio circuitry 166 may be configured to output sounds to one or more users and/or viewers of the controllable device 160. Examples of audio circuitry 166 include speakers and/or other audio and sound transducer devices that are suitable for outputting audio and other sounds.

The controllable device 160 also includes power circuitry 178. Power circuitry 178 may be configured to generate power and/or receive power and provide power to the controllable device 160. Examples of power circuitry 178 include batteries, power supplies, charging circuits, solar panels, and/or other devices that can generate power and/or receive power from a source external to the controllable device 160 and power the controllable device 160 with the generated and/or received generated power.

The controllable device 160 also includes processing system 168 which may be configured to operate the controllable device 160 in accordance with a part or all of the operations and/or methods disclosed herein. The processing system 168 includes one or more memories 170, one or more processors 172, and RAM 174. The one or more processors 172 can read one or more programs from the one or more memories 170 and execute them using RAM 174. In some embodiments, the one or more programs are configured to operate the controllable device 160 in accordance with a part of all of the operations and/or methods disclosed herein, such as those shown in FIG. 4. The one or more processors 172 may be of any type including but not limited to a microprocessor, a microcontroller, a CPU, a GPU, a DSP, an ASIC, a FPGA, or any combination thereof. In some embodiments, the one or more processors 172 may include a plurality of cores, a plurality of arrays, one or more coprocessors, and/or one or more layers of local cache memory.

The one or more memories 170 can be non-volatile and may include any type of memory device that retains stored information when powered off. Non-limiting examples of memory include EEPROM, flash memory, or any other type of non-volatile memory. At least one memory of the one or more memories 170 can include a non-transitory computer-readable storage medium from which the one or more processors 168 can read instructions. A computer-readable storage medium can include electronic, optical, magnetic, or other storage devices capable of providing the one or more processors 168 with computer-readable instructions or other program code. Non-limiting examples of a computer-readable storage medium include magnetic disks, memory chips, ROM, RAM, an ASIC, a configured processor, optical storage, or any other medium from which a computer processor can read the instructions.

In some embodiments, the one or more memories 170 include memory 232 (FIG. 2). As shown in FIG. 2, memory 232 includes a position determination unit 234, an instruction transmitting unit 236, and a command signal receiving unit 238. The position determination unit 234 is configured to determine a position of the controllable device 160 within the area and send a notification to the network-enabled device 140 that includes the position of the controllable device 160 in the area. In some embodiments, the position determination unit 234 is configured to determine the position of the controllable device 160 based on signals received by one or more UWB receivers included in the communications circuitry 164 of the controllable device 160 from UWB positioning devices installed in the area. In some embodiments, position determination unit 234 determines the position of the controllable device 160 by transmitting ranging signals from the one or more UWB receivers to the UWB positioning devices, receiving ranging signals with the one or more UWB receivers transmitted from the UWB positioning devices, performing a ranging operation based on the ranging signals, and performing a trilateration or multilateration operation based on the ranging operation. In some embodiments, the position determination unit 234 can perform the ranging operation based on one on more of AOA, TDoA, TWR, ToF, and PDoA. In some embodiments, the position determination unit 234 can perform the trilateration or multilateration operation based on a ranging operation performed between the controllable device 160 and at least three different UWB positioning devices. In some embodiments, the position determination unit 234 can determine the position of the controllable device 160 based on the distance between the controllable device 160 and each of the at least three UWB positioning devices. In some embodiments, the position of the controllable device 160 lies on an intersection point between circles having radiuses representing the distances between the controllable device 160 and the different UWB positioning devices.

The instruction transmitting unit 236 is configured to transmit a list of available instructions to the network-enabled device 140. In some embodiments, each instruction in the list of available instructions is an instruction for controlling the controllable device 160 in a certain way. For example, a first instruction in the list of available instructions can be an instruction for powering on the controllable device 160, a second instruction in the list of available instructions can be an instruction for powering down the controllable device 160, a third instruction in the list of available instructions can be an instruction for changing an operation of the controllable device 160 (e.g., changing a channel, raising the volume, decreasing a speed, lowering the temperature), and so on. In some embodiments, the instructions in the list of available instructions is received from the controllable device 160 such that the user can, using the network-enabled device 140, associate each instruction in the list of available instructions with a gesture in the set of gestures, a voice command in the list of voice commands, the volume adjustment button, the channel selection button, the guide button, and/or the menu button. In some embodiments, the instructions in the list of available instructions are instructions that are available only when functionality of the electronic device is being enhanced with a wearable device. In other embodiments, the instructions in the list of available instructions are instructions that are not available when the electronic device is the only device used to control the controllable device 160.

The command signal receiving unit 238 is configured to receive a command signal sent by the network-enabled device 140. In some embodiments, the command signal includes an instruction for controlling the controllable device 160. In some embodiments, the instruction corresponds to an instruction in the list of available instructions. In other embodiments, the instruction is not in the list of available instructions. In some embodiments, the command signal receiving unit 238 associates the received instruction included in the command signal with a preset instruction in a set of preset instructions for controlling the controllable device 160 and controls the controllable device 160 in accordance with the preset instruction. For example, the command signal may include an instruction to set a sleep timer for the controllable device 160 and the command signal receiving unit 238 may associate this instruction with the preset instruction that delays powering off the controllable device 160.

The controllable device 160 also includes one or more storage devices 176 configured to store data and other information received by and/or generated by the controllable device 160, the network-enabled device 140, and/or the wearable device 110. The one or more storage devices 176 may be removable storage devices, non-removable storage devices, or a combination thereof. Examples of removable storage and non-removable storage devices include magnetic disk devices such as HDDs; optical disk drives such CD drives and DVD drives; SSDs; and tape drives.

The controllable device 160 may also include other I/O components. Examples of such input components can include a mouse, a keyboard, a trackball, a touch pad, a touchscreen display, a stylus, a data glove, and the like. Examples of such output components can include a holographic display, a 3D display, a projector, and the like. The foregoing description of the controllable device 160 is not intended to be limiting and the controllable device 160 may include fewer components or additional components than those described above.

The controllable device 160 may also include orientation detection circuitry. The orientation detection circuitry may be configured to determine a location, a position, an orientation, an attitude, and/or a posture for the controllable device 160. The orientation detection circuitry may also be configured to determine a range between the controllable device 160 and other devices such as network-enabled device 140 and wearable device 110. Examples of orientation detection circuitry include one or more satellite navigation devices such as GPS devices, indoor localization devices such as UWB transmitters and receivers, LiDAR localization devices, RADAR localization devices, WiFi localization devices, microwave localization devices, Bluetooth localization devices, accelerometers, gyroscopes, motion sensors, tilt sensors, inclinometers, angular velocity sensors, gravity sensors, IMUs, magnetometers, and compasses. Other examples of orientation detection circuitry include other devices that are suitable for determining an indoor position, an outdoor position, an orientation, and a posture of the controllable device 160 and determining a range between the controllable device 160 and one or more other devices.

As described above, system 100 includes wireless links 180 that enable the wearable device 110, the network-enabled device 140, and the controllable device 160 to communicate with, send data and other information to, and receive data and other information from each other. For example, a wireless link of wireless links 180 enables the wearable device 110 to communicate with, send data and other information to, and receive data and other information from the network-enabled device 140 and the controllable device 160. Similarly, a wireless link of wireless links 180 enables the network-enabled device 140 to communicate with, send data and other information to, and receive data and other information from the wearable device 110 and the controllable device 160. Likewise, a wireless link of wireless links 180 enables the controllable device 160 to communicate with, send data and other information to, and receive data and other information from the network-enabled device 140 and the wearable device 110. In some embodiments, the wearable device 110, the network-enabled device 140, and the controllable device 160 may form part of the same network such as a local area network (LAN), a wide area network (WAN), a virtual private network (VPN), a peer-to-peer (P2P) network, and the like. In some embodiments, the network may be an encrypted and/or unencrypted network.

The system 100 has been described with respect to a wearable device 110, a network-enabled device 140, and a controllable device 160. However, the foregoing implementation is not intended to be limiting. The system 100 may include fewer or additional components that are configured to provide a device with enhanced functionality in accordance with a part or all of the operations and/or methods disclosed herein. For example, the system 100 may include the wearable device 110 and the controllable device 160 and the wearable device 100 may additionally perform the functions of the network-enabled device 140. In another example, the system 100 may include the wearable device 110 and the controllable device 160 and the controllable device 160 may additionally perform the functions of the network-enabled device 140. In other examples, the network-enabled device 140 may be built into or otherwise attached to the wearable device 110 and the controllable device 160.

Additionally, the system 100 may include different components that are configured to provide an electronic device with enhanced functionality in accordance with a part or all of the operations and/or methods disclosed herein. In some embodiments, each of the components of the system 100 may include one or more smart devices (i.e., a device that is capable of connecting to other devices through a network and/or the Internet). In some embodiments, each of the components of the system 100 can be a computing device that is configured with enhanced functionality in accordance with a part or all of the operations and/or methods disclosed herein. In some embodiments, the computing device may be implemented as a wearable device (e.g., a smart watch, fitness tracker, smart eyeglasses, head-mounted device, smart clothing device, etc.) that includes a band such that a user can wear the wearable device on a body part (e.g., their wrist, head, waist, ankle, etc.). In some embodiments, the computing device may be also be implemented as a communication device (e.g., a smart, cellular, mobile, wireless, portable, and/or radio telephone, etc.); a home automation controller (e.g., alarm system, thermostat, control panel, door lock, smart hub, etc.); a home appliance device (e.g., a smart speaker, television, a streaming stick or device, such as a Google® Chromecast®, home theater system, refrigerator, dishwasher, washer, dryer, oscillating fan, ceiling fan, smart lights, etc.); a gaming device (e.g., gaming controller, data glove, etc.); and/or other portable computing device (e.g., a tablet, phablet, notebook, and laptop computer; a personal digital assistant; display hub; etc.). In some embodiments, the computing device may be implemented as any kind of electronic device that can be configured with enhanced functionality in accordance with a part or all of the operations and/or methods disclosed herein.

The operations and/or methods disclosed herein enable an electronic device for controlling a controllable device to be provided with enhanced functionality. In some embodiments, the electronic device may include some functionality for controlling the controllable device, but not other functionality. For example, the electronic device may include physical buttons, a touchscreen display, and a speaker for controlling the controllable device and receiving feedback when the controllable device has been controlled, but the electronic device may not have the capability to control the controllable device based on gestures and voice input and/or generate haptic feedback in response to the controlling. With the operations and/or methods disclosed herein, the electronic device can be enhanced with such functionality using a network-enabled device and a wearable device.

Figure 3:
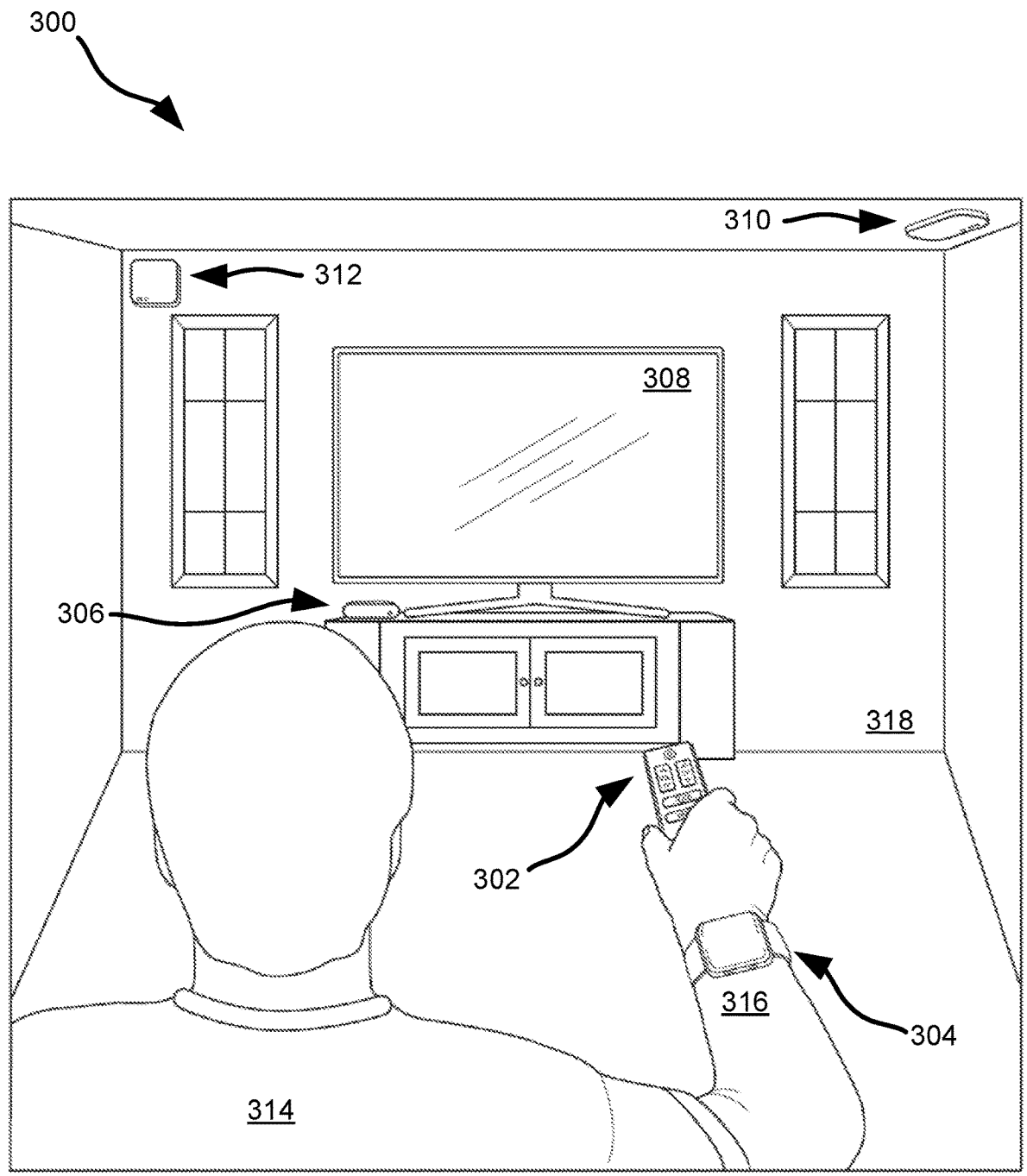
FIG. 3 shows an embodiment of an example environment of an electronic device with enhanced functionality according to some aspects of the present disclosure.

FIG. 3 shows an example environment 300 of an electronic device with enhanced functionality. As shown in FIG. 3, a user 314 wearing a wearable device 304 on their wrist 316 and holding an electronic device 302 (e.g., a remote control) for controlling a controllable device 308 (e.g., a television) may wish to enhance the functionality of the electronic device 302 with the wearable device 304 (e.g., smart watch). In this case, the user 314 may place the wearable device 304 into an enhanced functionality mode by orienting the wearable device 304 such that a plane of a display screen (e.g., touchscreen display 406, 506 shown in FIGS. 4 and 5 respectively) of the wearable device 304 is parallel to a ground plane, holding the wearable device 304 in the orientation for a minimum period of time (e.g., two seconds), and performing a predetermined gesture such as twisting their wrist in a clockwise direction such that the plane of the display screen of the wearable device 304 becomes perpendicular to the ground plane. As described above, the wearable device 304 can determine its orientation based on signals output by orientation detection circuitry of the wearable device 304 and a frame of reference and can recognize gestures based on signals output by the orientation detection circuitry and a list of defined gestures.

In response to the wearable device 304 entering the enhanced functionality mode, the wearable device 304 sends a notification to a network-enabled device 306 (e.g., a Chromecast®) that includes an indication that the wearable device 304 has entered into the enhanced functionality mode and a position of the wearable device 304 within an area 318 such as a room. As described above, the wearable device 304 can determine its position based on one or more UWB receivers of the wearable device 304 and UWB positioning devices 310, 312 installed in the area 318.

In response to the network-enabled device 306 receiving the notification from the wearable device 304, the network-enabled device 306 can determine that the wearable device 304 is located within a predetermined distance from the controllable device 308. As described above, the network-enabled device 306 can determine whether the wearable device 304 is located within a predetermined distance from the controllable device 308 by comparing the position of the wearable device 304 in the area 318 to the position of the controllable device 308 in the area 318. As described above, the controllable device 308 can determine its position based on one or more UWB receivers of the controllable device 308 and UWB positioning devices 310, 312 installed in the area 318 and send a notification to the network-enabled device 306 that includes its position.

Figure 4:
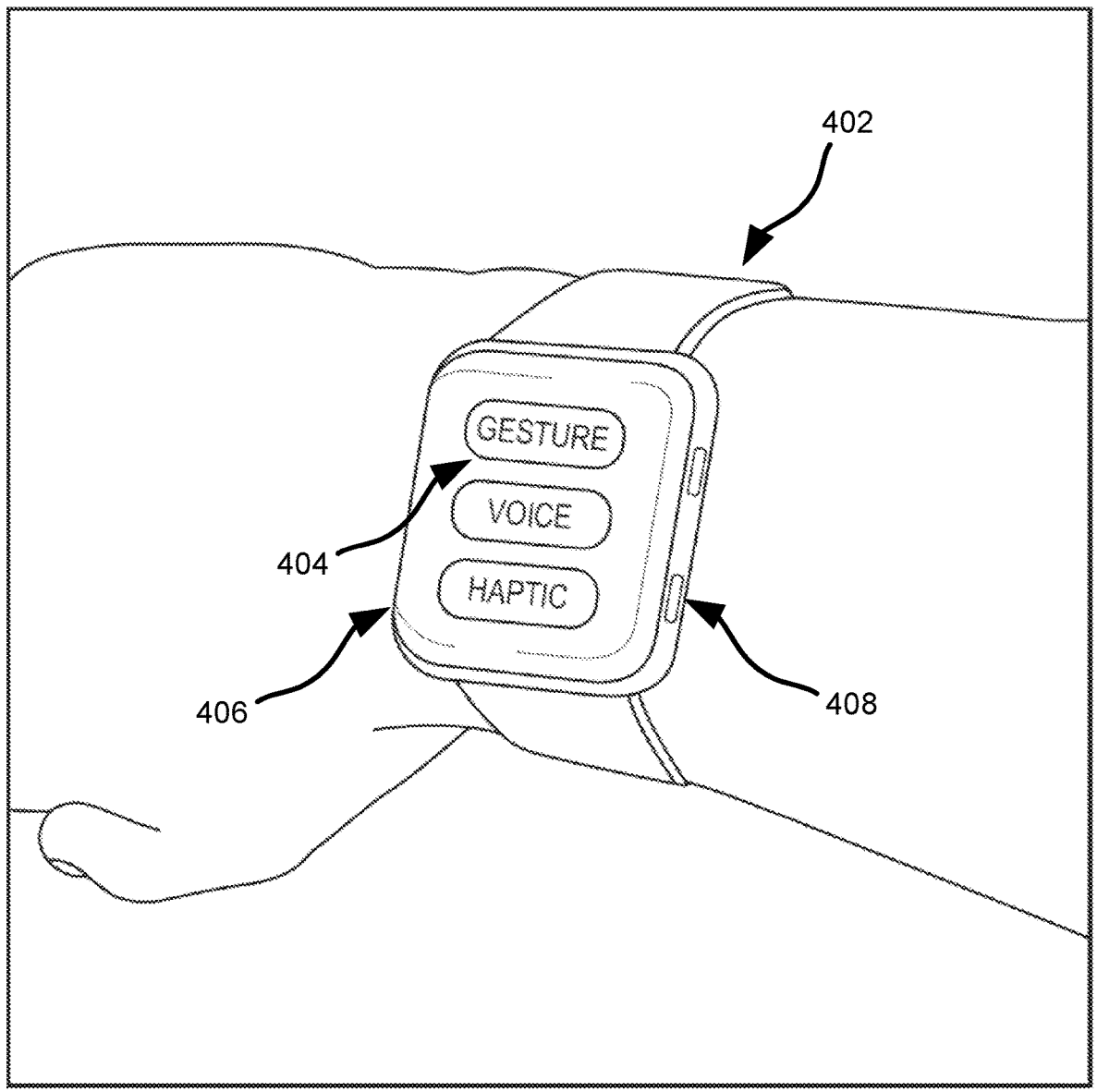
FIG. 4 shows an embodiment of an example of a user interface of a wearable device according to some aspects of the present disclosure.
Figure 5:
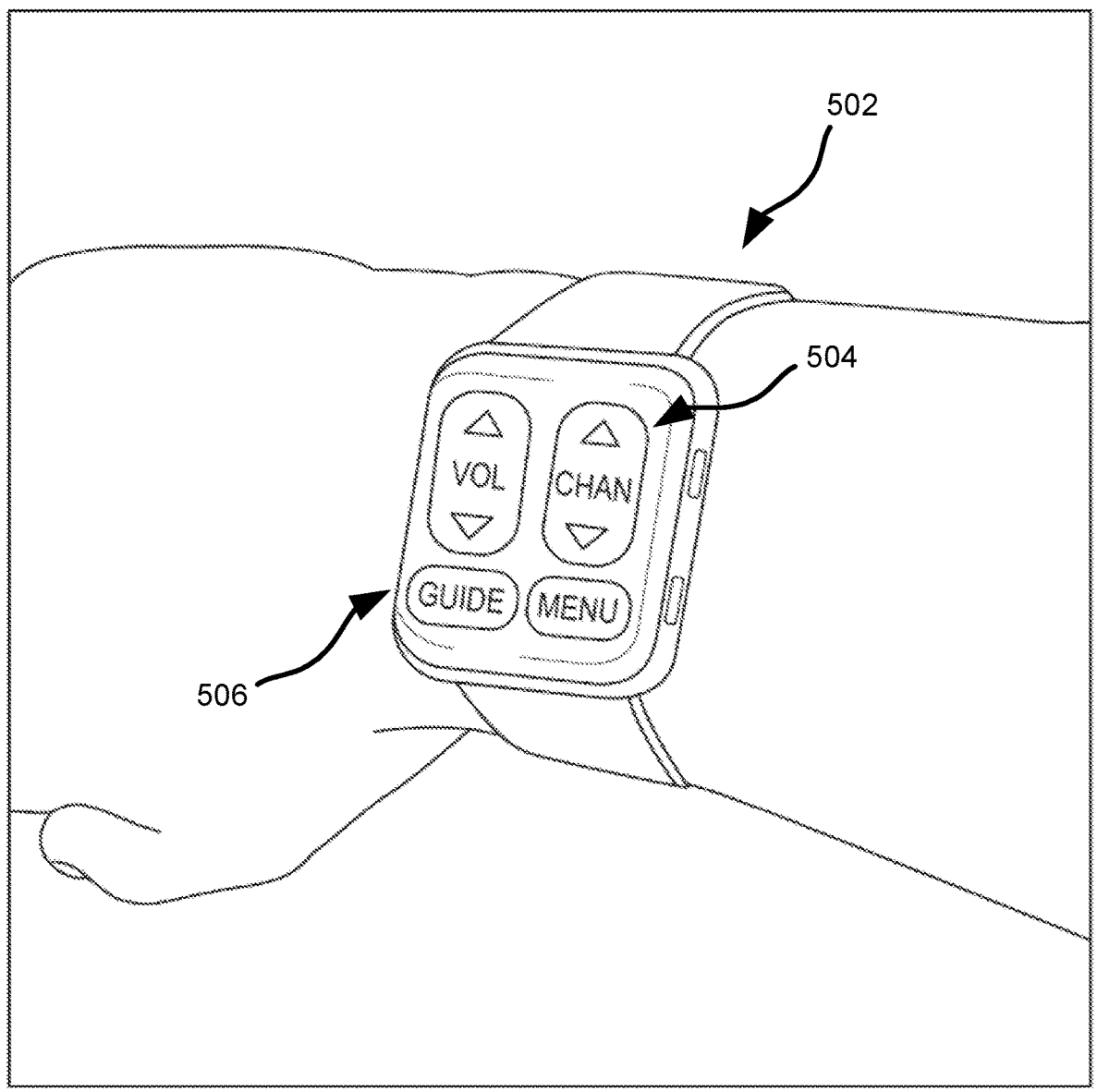
FIG. 5 shows an embodiment of another example of a user interface of a wearable device according to some aspects of the present disclosure.

In response to the network-enabled device 306 determining that the wearable device 304 is located within a predetermined distance from the controllable device 308, the network-enabled device 306 can generate and send one or more GUI pages to the wearable device 304. In some embodiments, the GUI page can include buttons that can be displayed on a display of the wearable device 110. For example, as shown in FIGS. 4 and 5, buttons 404, 504 can be displayed on a touchscreen display 406, 506 of the wearable device 402, 502. As shown in FIG. 4, the buttons 404 can include a gesture button, a voice button, and a haptic button. As shown in FIG. 5, the buttons 505 can include a volume adjustment button, a channel selection button, a guide button, and a menu button. In some embodiments, the buttons 404, 504 can be selected or otherwise activated by touching the areas of the touchscreen display 406, 506 that include the buttons 404, 504. In other embodiments, the buttons 404, 504 can be selected or otherwise activated by operating selection buttons 408. In some embodiments, the GUI page can include information about a status and/or an operation of the controllable device 308.

In the case of the GUI page including the gesture button, the voice button, and the haptic button, when the user 314 selects or otherwise activates the gesture button and performs a gesture (e.g., a left flick gesture, a right flick gesture, an up flick gesture, and a down flick gesture) with the wearable device 304, 402, 502 that is recognized and in the list of defined gestures, the wearable device 304, 402, 502 can send a notification to the network-enabled device 306 that indicates that the gesture button has been selected or otherwise activated and the gesture performed by the user 314.

When the user 314 selects or otherwise activates the voice button and speaks a voice command (e.g., turn on the device) to the wearable device 304, 402, 502 that is recognized and in the list of voice commands, the wearable device 304, 402, 502 can send a notification to the network-enabled device 306 that indicates that the voice button has been selected or otherwise activated and the voice command spoken by the user 314.

When the user 314 selects or otherwise activates the haptic button, the wearable device 304, 402, 502 can provide haptic feedback to the user 314 in response to receiving a confirmation signal from the network-enabled device 306 that a command signal has been sent from the network-enabled device 306 to the controllable device 308. The wearable device 304, 402, 502 can provide haptic feedback such as a predetermined vibration pattern in response to receiving the confirmation signal.

In the case of the GUI page including the volume adjustment button, the channel selection button, the guide button, and the menu button, when the user 314 selects or otherwise activates these buttons, the wearable device 304, 402, 502 can send a notification to the network-enabled device 306 that indicates which button has been selected or otherwise activated.

In response to receiving the notification, the network-enabled device 306 can send a command signal to the controllable device 308 that includes an instruction for controlling the controllable device 308. The instruction can correspond to the gesture performed by the user 314, voice command spoken by the user 314, and/or button selected or otherwise activated by the user 314. Each instruction in the list of instructions can be an instruction for controlling the controllable device 308 in a certain way. For example, a first instruction in the list of instructions can be an instruction for powering on the controllable device 308, a second instruction in the list of instructions can be an instruction for powering down the controllable device 308, a third instruction in the list of instructions can be an instruction for changing an operation of the controllable device 308 (e.g., changing a channel or raising the volume in the case of the controllable device 308 being a television), and so on. In response to receiving the command signal, the controllable device 308 can execute the received instruction. In this way, functionality of the electronic device 302 can be extended with the wearable device 304, 402, 502 and the network-enabled device 306.

Figure 6:
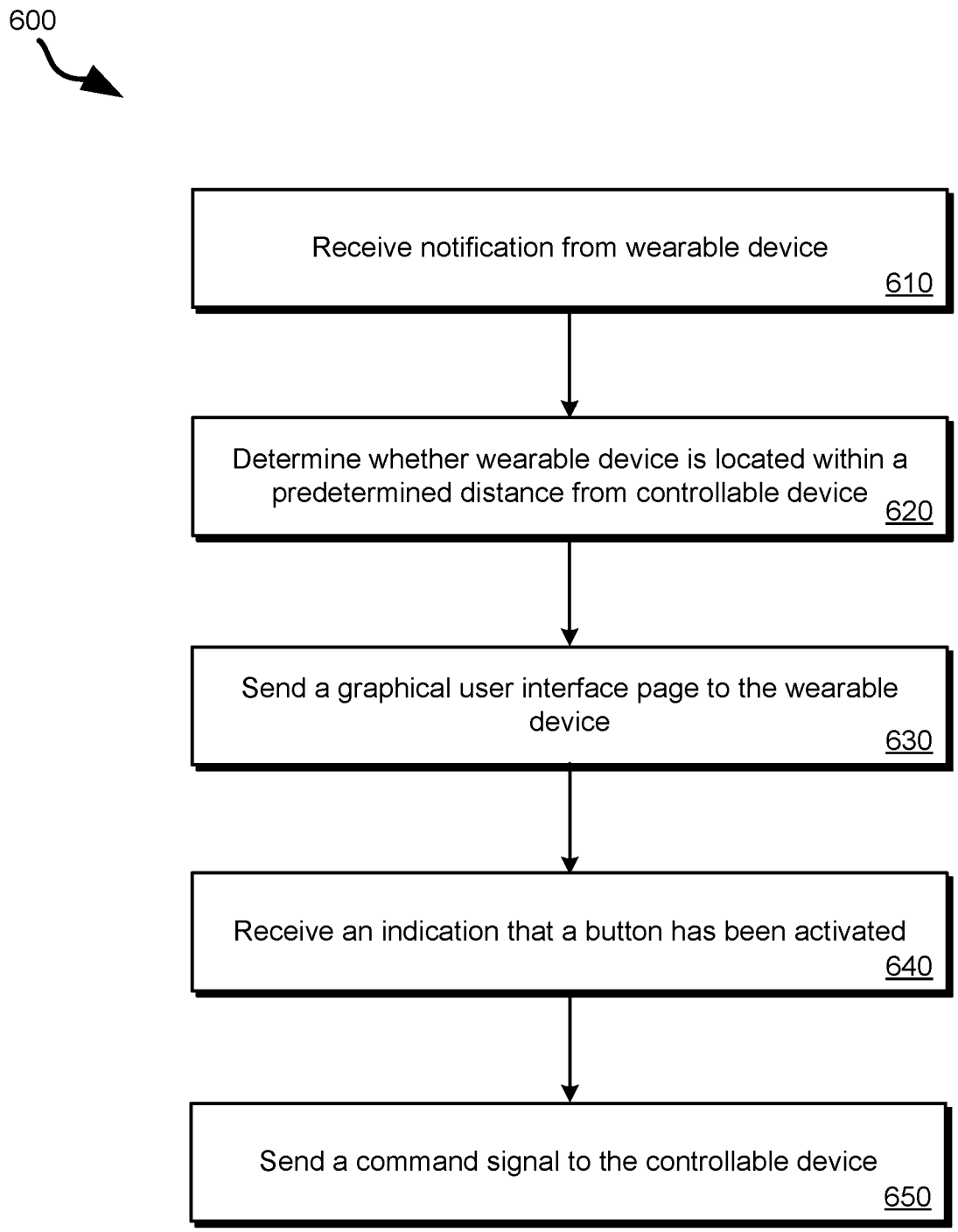
FIG. 6 shows a flowchart of an embodiment of a process for enhancing functionality of an electronic device for controlling a controllable device according to some aspects of the present disclosure.

FIG. 6 shows a flowchart of an embodiment of a process 600 for enhancing functionality of an electronic device for controlling a controllable device. In some embodiments, the process 600 can be implemented by system 100 to enhance functionality of an electronic device, such as electronic device 302. In some embodiments, the process 600 can be implemented by a network-enabled device, such as network-enabled device 140, 306. The process 600 can be implemented in software or hardware or any combination thereof.

At block 610, a notification is received from a wearable device. In some embodiments, the wearable device is worn by a user on a body part of the user. The user may desire to enter the wearable device into an enhanced functionality mode in which the wearable device enhances the functionality of the electronic device. To enter the enhanced functionality mode, the user may hold the wearable device in a particular orientation for a predetermined period of time (e.g., two seconds) and then perform a predetermined gesture with the wearable device. The notification is sent from the wearable device in response to a determination that the user has oriented the wearable device in the particular direction for the predetermined period of time and performed the predetermined gesture with the wearable device.

In some embodiments, the particular direction is a direction in which a plane of a display screen of the wearable device is parallel to a ground plane. The orientation of the wearable device can be determined based on signals output by orientation detection circuitry of the wearable device relative to a frame of reference. The frame of reference can be based on a default orientation of the orientation detection circuitry, a default orientation of the wearable device, and/or the Earth (e.g., an Earth-centered, Earth-fixed frame of reference, a north-east-down frame of reference, and/or an earth-centered inertial frame of reference).

In some embodiments, a gesture in a list of defined gestures is set as the predetermined gesture. For example, the user may identify a gesture in the list of defined gestures that corresponds to a clockwise rotation of the wearable device and set that gesture as the predetermined gesture. The wearable device can detect gestures based on signals output by the orientation detection circuitry. In some embodiments, the wearable device detects whether the user has performed a gesture by determining whether or not the user has continuously moved the wearable device from a starting position to an end position. For example, the wearable device can determine that the user has moved the wearable device from a starting position in which a plane of a display screen of the display circuitry is parallel to a ground plane to an end position in which the plane of the display screen is perpendicular to the ground plane (i.e., the user has performed a wrist rotation gesture). In some embodiments, movement of the wearable device can be determined based on signals output by the orientation detection circuitry and the orientation of the wearable device.

In some embodiments, in response to the wearable device detecting that the user has performed a gesture, the wearable device can recognize the detected gesture by converting the signals output by the orientation detection circuitry during movement of the wearable device into motion vectors and comparing the motion vectors for the detected gesture to motion vectors for gestures in the list of defined gestures. In some embodiments, the motion vectors for the gestures in the list of defined gestures can correspond to motion vectors converted from signals that would be output by the orientation detection circuitry if those gestures were performed by the user wearing the wearable device. In some embodiments, the wearable device can define the gestures in the list of defined gestures by measuring the signals output by the orientation detection circuitry while the user is performing the gestures in a gesture recognition set-up mode. In some embodiments, the list of defined gestures can be stored in one or more storage devices of the wearable device and include between 2 and 10 gestures. In some embodiments, the defined gestures may include gestures corresponding to rotational and/or translational movements of the wearable device.

The notification includes a position of the wearable device within an area. The position of the wearable device can be determined based on signals received by one or more UWB receivers included in the orientation detection circuitry from UWB positioning devices installed in the area. In some embodiments, the position of the wearable device is determined by transmitting ranging signals from the one or more UWB receivers to the UWB positioning devices, receiving ranging signals with the one or more UWB receivers transmitted from the UWB positioning devices, performing a ranging operation based on the ranging signals, and performing a trilateration or multilateration operation based on the ranging operation. In some embodiments, the ranging operation can be performed based on one on more of AOA, TDoA, TWR, ToF, and PFoA. In some embodiments, the trilateration or multilateration operation can be performed based on a ranging operation performed between the wearable device and at least three different UWB positioning devices. In some embodiments, the position of the wearable device can be determined based on the distance between the wearable device and each of the at least three UWB positioning devices. In some embodiments, the position of the wearable device lies on an intersection point between circles having radiuses representing the distances between the wearable device and the different UWB positioning devices.

At block 620, a determination is made whether or not the wearable device is located within a predetermined distance from the controllable device based on the position of the wearable device within the area. In some embodiments, the determination can be made by comparing the position of the wearable device in the area to the position of the controllable device in the area. As described above, the position of the wearable device within the area may be included in the notification sent from the wearable device. The position of the controllable device within the area may be included in a notification sent from the controllable device.

In some embodiments, the position of the controllable device is determined based on signals received by one or more UWB receivers included in communications circuitry of the controllable device from UWB positioning devices installed in the area. In some embodiments, the controllable device determines its position by transmitting ranging signals from the one or more UWB receivers to the UWB positioning devices, receiving ranging signals with the one or more UWB receivers transmitted from the UWB positioning devices, performing a ranging operation based on the ranging signals, and performing a trilateration or multilateration operation based on the ranging operation. In some embodiments, the ranging operation can be performed based on one on more of AOA, TDoA, TWR, ToF, and PDoA. In some embodiments, the trilateration or multilateration operation can be performed based on a ranging operation performed between the controllable device and at least three different UWB positioning devices. In some embodiments, the controllable device can determine its position based on the distance between it and each of the at least three UWB positioning devices. In some embodiments, the position of the controllable device lies on an intersection point between circles having radiuses representing the distances between the controllable device and the different UWB positioning devices.

In some embodiments, the user may set the predetermined distance or the predetermined distance can be set based on an estimated size of the area. In some embodiments, the size of the area can be estimated based on transmitted and received signals (e.g., ranging signals).

At block 630, a GUI page is generated and sent to the wearable device. In some embodiments, the GUI page is generated and sent to the wearable device in response to determining that the wearable device is located within the predetermined distance from the controllable device. In some embodiments, the GUI page can include buttons that can be displayed on a display (e.g., a touchscreen display) of the wearable device. In some embodiments, the buttons include a gesture button, a voice button, and a haptic button. In other embodiments, the buttons include a volume adjustment button, a channel selection button, a guide button, and a menu button.

At block 640, an indication that a first button of the buttons has been selected or otherwise activated is received from the wearable device. In some embodiments, an indication that a second button of the buttons has been selected or otherwise activated is also received from the device. In some embodiments, an indication is received from the wearable any time a button of the buttons has been selected or otherwise activated. In some embodiments, the indication is received in response to the user touching one or more areas of a touchscreen display of the wearable device that corresponds to one or more of the buttons.

The wearable device can send a notification that indicates the button included in the GUI page that has been selected or otherwise activated in response to the user selecting or otherwise activating the button. For example, in the case of the GUI page including the gesture button, the voice button, and the haptic button, when the user selects or otherwise activates the gesture button and performs a gesture (e.g., a left flick gesture, a right flick gesture, an up flick gesture, and a down flick gesture) with the wearable device that is recognized and in the list of defined gestures, the wearable device can send a notification that indicates that the gesture button has been selected or otherwise activated and the gesture performed by the user. The wearable device can detect and recognize gestures as described above.

Similarly, when the user selects or otherwise activates the voice button and speaks a voice command (e.g., turn on the device) to the wearable device that is recognized and in the list of voice commands, the wearable device can send a notification that indicates that the voice button has been selected or otherwise activated and the voice command spoken by the user. The wearable device can recognize voice commands based on signals output by audio circuitry included in the wearable device. In some embodiments, the wearable device includes VAD functionality and SLU functionality including speech recognition and NLU functionality. The wearable device can recognize voice commands by converting the signals output by the audio circuitry into one or more input words, phrases, and/or statements and comparing the one or more input words, phrases, and/or statements to one or more words, phrases, and/or statements in a list of voice commands. In some embodiments, the one or more input words, phrases, and/or statements can be converted into one or more feature vectors and compared to one or more feature vectors corresponding to the words, phrases, and/or statements in the list of voice commands. In some embodiments, the wearable device can define the voice commands in the list of voice commands by processing the signals output by the audio circuitry using the SLU functionality while the user speaks in a voice command recognition set-up mode. In some embodiments, the list of voice commands can be stored in the one or more storage devices of the wearable device and include between 2 and 10 voice commands. In some embodiments, the list of voice commands may include voice commands related to operational controls of the controllable device (e.g., power on, power off, delayed start, timer, mode, etc.).

In the case of the GUI page including the volume adjustment button, the channel selection button, the guide button, and the menu button, when the user selects or otherwise activates these buttons, the wearable device can send a notification that indicates which of these buttons has been selected or otherwise activated.

At block 650, a first command signal that includes a first instruction for controlling the controllable device is sent to the controllable device in response to receiving the indication. In some embodiments, the first instruction corresponds to a gesture performed by the user. In some embodiments, a second command signal that includes a second instruction for controlling the controllable device is sent to the controllable device in response to receiving the indication. In some embodiments, the second instruction corresponds to a voice command made by the user. In some embodiments, a command signal that includes an instruction for controlling the controllable device is sent to the controllable device any time an indication is received from the wearable device that a button of the buttons has been selected or otherwise activated.

In some embodiments, a list of instructions for controlling the controllable device is stored in one or more storage devices along with an association between a set of gestures and the list of instructions such that each gesture in the set of gestures is associated with an instruction in the list of instructions. An association between a set of voice commands and the list of instructions is also stored in the one or more storage devices such that each voice command in the set of voice commands is associated with an instruction in the list of instructions. In some embodiments, an association between the volume adjustment button, the channel selection button, the guide button, and the menu button and the list of instructions is also stored in the one or more storage devices such that each of the volume adjustment button, the channel selection button, the guide button, and the menu button is associated with an instruction in the list of instructions.

Each instruction in the list of instructions can be an instruction for controlling the controllable device in a certain way. For example, a first instruction in the list of instructions can be an instruction for powering on the controllable device, a second instruction in the list of instructions can be an instruction for powering down the controllable device, a third instruction in the list of instructions can be an instruction for changing an operation of the controllable device (e.g., changing a channel, raising the volume, decreasing a speed, lowering the temperature), and so on.

The instructions in the list of instructions can be defined by the user. For example, during a set-up mode, the user can define each instruction in the list of instructions and associate a gesture from the set of gestures and/or a voice command from the set of voice commands with a respective instruction. In some embodiments, a list of available instructions is received from the controllable device such that the user can associate each instruction in the list of available instructions with a gesture in the set of gestures, a voice command in the list of voice commands, the volume adjustment button, the channel selection button, the guide button, and/or the menu button. In some embodiments, the instructions in the list of available instructions are instructions that are available only when functionality of the electronic device is being enhanced with a wearable device. In other embodiments, the instructions in the list of available instructions are instructions that not available when the electronic device is the only device used to control the controllable device.

In some embodiments, a confirmation signal is sent to the wearable device in response to the command signal being sent to the controllable device. The confirmation signal can serve as a confirmation to the user that a command signal has been sent to the controllable device. In some embodiments, when the user selects or otherwise activates the haptic button included in the GUI page, the wearable device can provide haptic feedback to the user in response to receiving the confirmation signal. The wearable device can provide haptic feedback such as a predetermined vibration pattern in response to receiving the confirmation signal.

In some embodiments, upon receiving the command signal, the controllable device associates the received instruction included in the command signal with a preset instruction in a set of preset instructions for controlling the controllable device and controls the controllable device in accordance with the preset instruction. For example, the command signal may include an instruction to set a sleep timer for the controllable device and the controllable device may associate this instruction with the preset instruction that delays powering off the controllable device.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present disclosure as claimed has been specifically disclosed by embodiments and optional features, modification, and variation of the concepts herein disclosed may be resorted to by those skilled in the art, and that such modifications and variations are considered to be within the scope of this invention as defined by the appended claims.

Specific details are given in the foregoing description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The above description of certain embodiments, including illustrated embodiments, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any embodiments described herein can be combined with any other embodiments.

The invention claimed is:

1. A method for enhancing functionality of an electronic device for controlling a controllable device comprising:
   receiving a notification from a wearable device, the notification including a position of the wearable device within an area, wherein the position of the wearable device is determined based on signals received by an ultra-wideband (UWB) receiver of the wearable device from a plurality of UWB positioning devices installed in the area;
   determining that the wearable device is located within a predetermined distance from the controllable device based on the position of the wearable device within the area;
   sending a graphical user interface page to the wearable device, the graphical user interface page comprising a plurality of buttons for display on a touchscreen display of the wearable device;
   receiving an indication that a first button of the plurality of buttons has been activated from the wearable device; and
   sending a first command signal including a first instruction to the controllable device, the first instruction corresponding to a gesture performed by a user wearing the wearable device.

2. The method of claim 1, wherein the wearable device generates the notification in response to a determination that the user has oriented the wearable device in a particular direction and performed a predetermined gesture with the wearable device.

3. The method of claim 2, wherein:
   the particular direction is a direction in which a plane of a display screen of the wearable device is parallel to a ground plane; and
   the determination that the user has oriented the wearable device in the particular direction is based on signals output by orientation detection circuitry of the wearable device.

4. The method of claim 1, wherein the plurality of buttons comprises a gesture button, a voice button, and a haptic button.

5. The method of claim 1, wherein the indication is received in response to the user touching an area of the touchscreen display of the wearable device that corresponds to the first button.

6. The method of claim 1, wherein the wearable device comprises a band for wearing the wearable device on a body part of the user.

7. The method of claim 1, wherein the controllable device comprises display circuitry for displaying video signals, audio circuitry for outputting audio signals, and communications circuitry for receiving command signals.

8. The method of claim 1, further comprising:
   receiving an indication that a second button of the plurality of buttons has been activated from the wearable device; and
   sending a second command signal including a second instruction to the controllable device, the second instruction corresponding to a voice command made by the user.

9. The method of claim 1, wherein the plurality of buttons corresponds to functionalities that are different from functionalities included in the electronic device.

10. A system for enhancing functionality of an electronic device for controlling a controllable device comprising:
    a wearable device;
    the controllable device; and
    a network-enabled device, communicatively coupled to the controllable device, comprising one or more processors and one or more memories, the one or more memories storing instructions which, when executed by the one or more processors, cause the one or more processors to perform operations comprising:
    receiving a notification from the wearable device, the notification including a position of the wearable device within an area, wherein the position of the wearable device is determined based on signals received by an ultra-wideband receiver (UWB) of the wearable device from a plurality of UWB positioning devices installed in the area;
    determining that the wearable device is located within a predetermined distance from the controllable device based on the position of the wearable device within the area;
    sending a graphical user interface page to the wearable device, the graphical user interface page comprising a plurality of buttons for display on a touchscreen display of the wearable device;
    receiving an indication that a first button of the plurality of buttons has been activated from the wearable device; and sending a first command signal including a first instruction to the controllable device, the first instruction corresponding to a gesture performed by a user wearing the wearable device.

11. The system of claim 10, wherein the wearable device generates the notification in response to a determination that the user has oriented the wearable device in a particular direction and performed a predetermined gesture with the wearable device.

12. The system of claim 11, wherein:
the particular direction is a direction in which a plane of a display screen of the wearable device is parallel to a ground plane; and
the determination that the user has oriented the wearable device in the particular direction is based on signals output by orientation detection circuitry of the wearable device.

13. The system of claim 10, wherein the plurality of buttons comprises a gesture button, a voice button, and a haptic button.

14. The system of claim 10, wherein the indication is received in response to the user touching an area of the touchscreen display of the wearable device that corresponds to the first button.

15. The system of claim 10, wherein the wearable device comprises a band for wearing the wearable device on a body part of the user.

16. The system of claim 10, wherein the controllable device comprises display circuitry for displaying video signals, audio circuitry for outputting audio signals, and communications circuitry for receiving command signals.

17. The system of claim 10, the operations further comprising:
receiving an indication that a second button of the plurality of buttons has been activated from the wearable device; and
sending a second command signal including a second instruction to the controllable device, the second instruction corresponding to a voice command made by the user.

18. The method of claim 10, wherein the plurality of buttons corresponds to functionalities that are different from functionalities included in the electronic device.

19. One or more non-transitory computer-readable media storing computer-readable instructions that, when executed by one or more processors, cause the one or more processors to perform operations including:
receiving a notification from a wearable device, the notification including a position of the wearable device within an area, wherein the position of the wearable device is determined based on signals received by an ultra-wideband (UWB) receiver of the wearable device from a plurality of UWB positioning devices installed in the area;
determining that the wearable device is located within a predetermined distance from a controllable device based on the position of the wearable device within the area;
sending a graphical user interface page to the wearable device, the graphical user interface page comprising a plurality of buttons for display on a touchscreen display of the wearable device;
receiving an indication that a first button of the plurality of buttons has been activated from the wearable device; and
sending a first command signal including a first instruction to the controllable device, the first instruction corresponding to a gesture performed by a user wearing the wearable device.

20. The one or more non-transitory computer-readable media of claim 19, the operations further including:
receiving an indication that a second button of the plurality of buttons has been activated from the wearable device; and
sending a second command signal including a second instruction to the controllable device, the second instruction corresponding to a voice command made by the user.

* * * * *